Aug. 25, 1936.  G. J. ZIEGLER  2,052,068
COMBINED BREAKING PLOW AND CULTIVATOR
Filed March 18, 1935  3 Sheets-Sheet 3

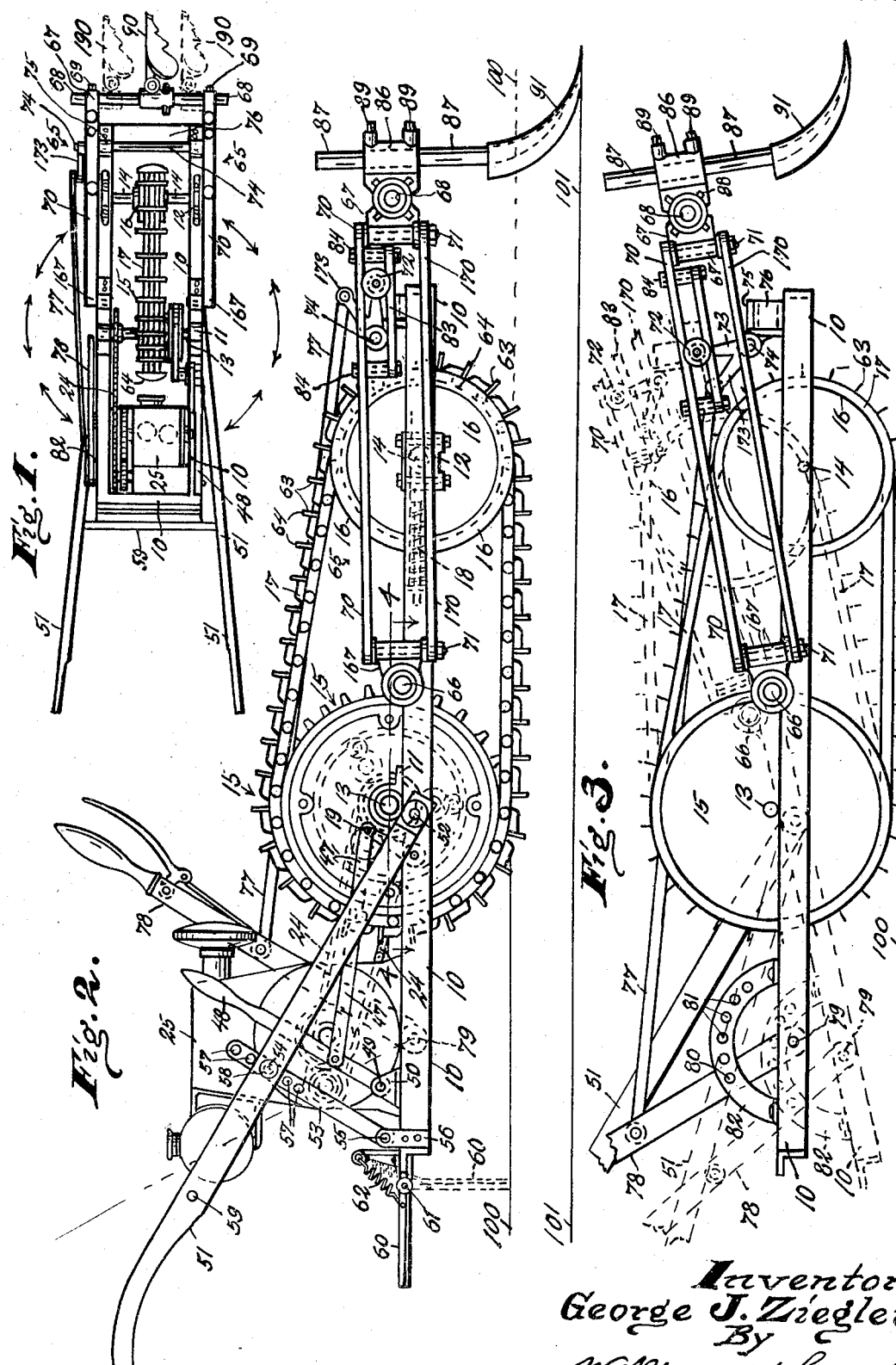

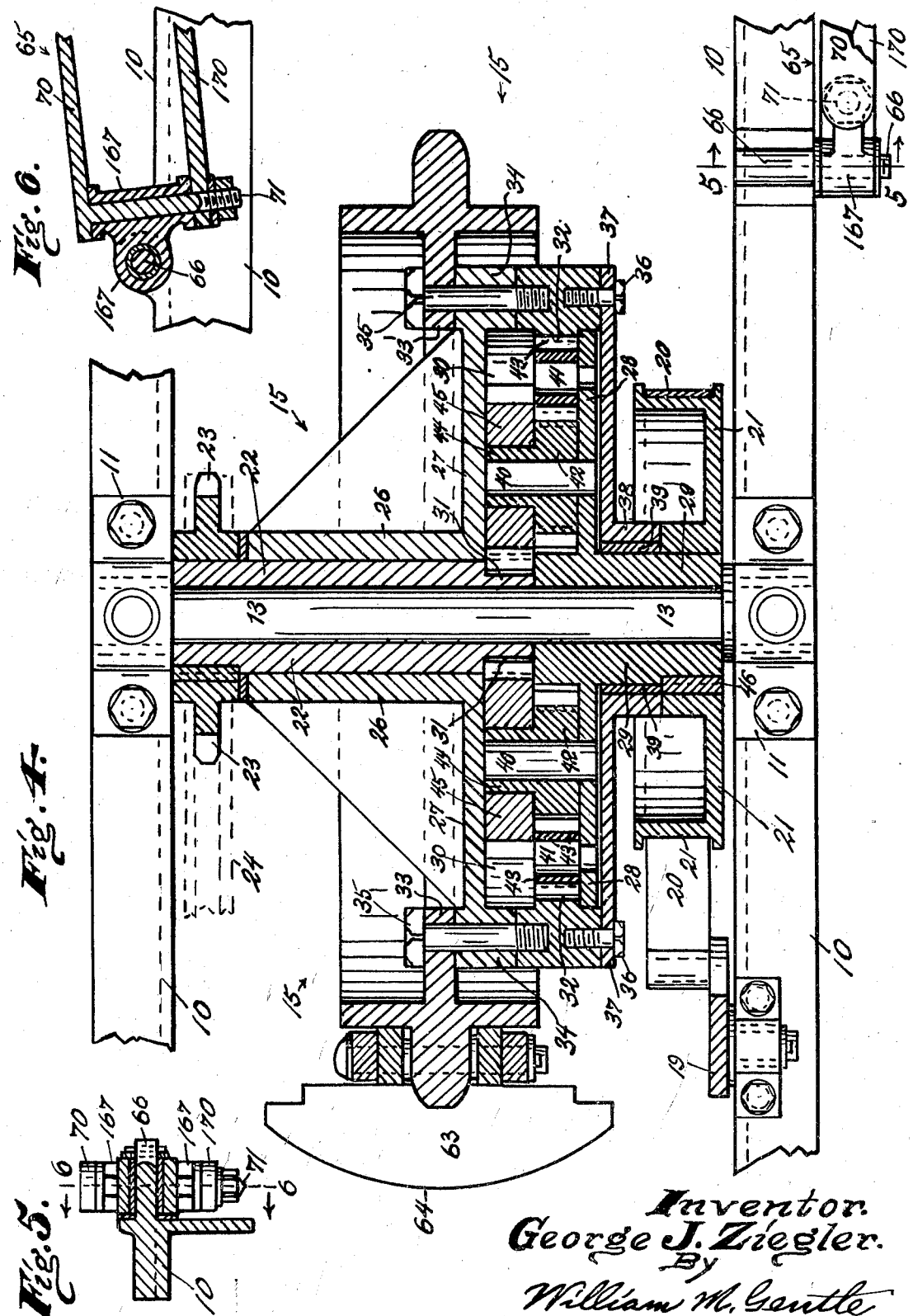

Inventor,
George J. Ziegler.
By
William M. Gentle
His Attorney.

Patented Aug. 25, 1936

2,052,068

UNITED STATES PATENT OFFICE 2,052,068

COMBINED BREAKING PLOW AND CULTIVATOR

George J. Ziegler, Los Angeles, Calif., assignor of one-half to Charles J. Heyler, Los Angeles, Calif.

Application March 18, 1935, Serial No. 11,629

3 Claims. (Cl. 97—48)

This invention relates to a combined breaking plow and cultivator and the principal object of the invention is to provide a power-operated cultivator of the walking type that is relatively light in weight and wieldy so it can be operated during an entire working day without arduous effort of the operator.

To that end I provide my cultivator with all parts reduced to a minimum as to weight but sufficiently strong to perform their function without danger of breakage, and with their weight distributed and balanced so it requires only a minimum amount of manual strength to hold the cultivator in an upright position and to guide and turn it while in operation.

A feature of invention is shown in constructing my cultivator so it can be used for breaking the ground and harrowing it into a mellow bed ready for seeding, and also thereafterward for tilling the soil until the crops are grown; and the foregoing is accomplished with no other change in the cultivator except to change from plow point to plow point.

Another feature of invention is shown in arranging the plow points in the front of the cultivator supported on rocking bars so they can be manually adjusted to cut to any desired depth in the soil or lifted clear therefrom without moving the body of the cultivator for the purpose of first cultivating or plowing to a uniform depth and to facilitate idle traveling or turning of the cultivator.

Another feature of invention is shown in the specific construction of the rocking bars and the means for actuating them and also the means for attaching the plow points to these bars.

Another feature of invention is shown in arranging the main drive wheel adjacent to but slightly in front of the center of gravity of the cultivator so it forms a pivot point on which the cultivator can be balanced when being turned at the ends of rows. That is, when the cultivator is to be turned, pressure is applied to the plow handles to lift the front end portion of the cultivator until both ends are clear, after which a sidewise thrust on the handles will cause the cultivator to turn on its pivot to reverse its position.

Another feature of invention is shown in mounting the engine in the rear of the drive wheel so its weight will aid in forming a near-balance between the front and rear ends of the cultivator so that it requires only a light pressure on the plow handles to overbalance and lift the front end of the cultivator.

Other objects, advantages and features of invention may appear from the accompanying drawings and the detailed description thereof. The accompanying drawings illustrate my invention, in which:

Figure 1 is a plan view of a combined breaking plow and cultivator constructed in accordance with this invention; parts omitted and other parts shown diagrammatically, and indicating by curved double pointed arrows that the apparatus can be turned in either direction with the pivot point directly under the drive wheel.

Fig. 2 is an enlarged side elevation of the apparatus shown in Fig. 1.

Fig. 3 is a view analogous to that shown in Fig. 2 with many of the parts indicated diagrammatically; and dotted lines indicating that the front end is tilted upward to throw all of the weight on a pivot point directly under the drive wheel so the apparatus can be turned in either direction.

Fig. 4 is an enlarged fragmental section on line 4—4, Fig. 2, showing the detailed construction of the drive wheel, gear drive and brake drum for controlling it.

Fig. 5 is a fragmental section on line 5—5, Fig. 4.

Fig. 6 is a section on line 6—6, Fig. 5.

Fig. 7 is an enlarged fragmental side view of a front end portion of the apparatus showing the skeleton arms in an elevated position, and the means for raising and lowering them.

Fig. 8 is a fragmental section on line 8—8, Fig. 7, showing a detailed construction of parts at the front end of the apparatus.

Fig. 9 is an enlarged view of the breaking plow shown at the front end of Fig. 1.

My combined breaking plow and cultivator includes a frame 10 that is relatively long and narrow, and secured to its side plates by bearings 11 and 12 are cross shafts 13 and 14.

The shaft 13 is arranged slightly in the rear of the center of gravity of the apparatus and has a combined planetary clutch and drive wheel 15 thereon with the rim of the wheel aligned centrally with the longitudinal axis of said frame and also central with a carrier wheel 16 on the shaft 14 arranged adjacent the front end of the frame, and these wheels carry the endless tread chain 17.

The bearings 12 are mounted on the frame so that the springs 18 will hold the tread chain taut on the wheels when in operation; and as the construction of these adjustable yielding bearings is old they are not shown or described in detail.

The wheel 15 is formed of a number of parts that are constructed and arranged so the rotation of the wheel can be controlled by a brake lever 19. That is, when the lever 19 is in one position the band 20 is loose on the drum 21 so it is free to rotate with the wheel 15 and when in another position causes the band to grip the drum and stop the rotation of both the drum and wheel rim; the internal mechanism of the wheel being constructed so it can continue rotating after the drive wheel rim has been stopped.

The drum, band and lever are old and shown in detail in my prior patent on Clutch dated June 27, 1933, No. 1,915,772, and for that reason are not shown or described in complete detail in this application.

Loosely mounted on the shaft 13 is a sleeve 22 that at its outer end is keyed to a sprocket wheel 23 that, through a chain 24, is driven by an engine 25 that is diagrammatically shown in the drawings, it being understood that any suitable engine can be used.

Loosely mounted on the sleeve 22 is a hub 26 that has a disk 27 on its inner end that is spaced away from a disk 28 integral with a hub 29 loosely mounted on the shaft 13, and the disks are arranged to form a chamber 30 between them in which planetary gears are supported that form a driving connection between a pinion 31 integral with the inner end of the sleeve 22 and a large internal gear 32.

The gear 32 and also the inner annular flange 33 of the drive sprocket 15 are secured to the rim 34 of the disk 27 by the bolts 35. Also secured by screw bolts 36 to the rim of the internal gear 32 is a disk 37 having a hub 38 that is loosely mounted on a bushing 39 on the hub 29 so that the disks 27 and 37, gear 32 and drive wheel 15 rotate together.

The disk 28 carries the spindles 40 and 41 on which the planetary gears 42 and 43 are mounted, the gears 42 having a hub 44 on which the intermediate gears 45 are shrunk so they rotate together.

The teeth of the gears 45 mesh with the pinion 31 on the sleeve 22 and rotate the gears 42. The gears 43 are interposed between the gears 45 and the teeth of the internal gear 32, so that when the sprocket wheel 23 is driven the internal gear 22 will be driven as well as all the other parts of the wheel 15.

The hub of the brake drum 21 is secured by a key 46 to the hub 29 so that when the rotation of the drum is interrupted the disk 28 will also stop so the planetary gears will run idle on their spindles.

By the foregoing construction and arrangement of parts the apparatus can be started and stopped by simply shifting the lever 19, it being understood that the engine will remain in operation regardless as to the position of this lever 19. The lever 19 is connected by a bar 47 with a hand lever 48 pivotally connected by a pin 49 to a bracket 50 secured to the rear end of the frame 10, see Fig. 1.

The lever 48 is within easy reach of an operator who walks behind the apparatus and guides it by the plow handles 51. These handles have their lower ends pivotally connected to the frame 10 by pins 52 and are adjustably connected to brace bars 53 by pins 54.

These brace bars have their lower ends pivotally connected by pins 55 to brackets 56 so they can be moved to bring any of the numerous holes 57 into register with the pin holes 58 to adjust the handle.

The handles 51 are spaced apart by the usual spacing bar 59, see Figs. 1 and 2.

A trip frame 60 is pivotally connected by hinges 61 to the rear end of the frame 10 so it aids in supporting the apparatus in an upright position when idle; and an off-center spring 62 is provided for holding this frame in position to support the plow when idle or hold the frame out of the way when the plow is in use, as illustrated by full and dotted lines in Fig. 1.

Each link of the chain 17 is provided with a spade lug 63 that aids in providing great traction to the apparatus, and preferably the lugs have rounded cutting edges 64 so that the apparatus can be more readily turned at the ends of rows when plowing.

A pair of skeleton arms 65 are pivotally secured by bearings 66 to the side rails of the frame 10, near the center of gravity thereof, and they are extended forward a slight distance over and beyond the front end of the frame 10 and have bearing brackets 67 to which a cross pipe 68 is secured by set screws 69.

Each of the arms 66 comprises spacing brackets 67, 167 at its front and rear ends to which top and bottom bars 70, 170 are secured by bolts 71, and preferably these bolts are integral with the top bars 70 and extend down through bolt holes in the brackets 67, 167.

Normally the top bars 70 rest on the rollers 72 of the crank arms 73 that are secured to a cross shaft 74 mounted in the bearings 75 that are attached to a stand 76 on the front end of the frame 10; and the arm 73 on the left hand side of the apparatus is in the form of a bell crank with the arm 173 connected by a draw bar 77 with a sector lever 78 pivotally connected to the front end of the frame by a pin 79 so it can be moved to engage a latch 80 with any of the holes 81 in the sector bar 82, see Fig. 3.

As the construction and operation of a sector lever is old and well understood the lever 78 is not shown or described in full detail; except to show that when this lever is in the position shown in Figs. 1 and 2, the arms will be down; and Fig. 3 shows the lever in another position and the arms in an elevated position.

Floating guide bars 83 are suspended under the top bars 70 by means of bolts 84 around which are spacing sleeves 85 so they aid in holding the rollers 72 centrally under the top bars 70.

The cross pipe 68 is secured to the skeleton arms 65 so it is held a sufficient distance in front of the frame 10 for the reversible plow supporting brackets 86 to be arranged for holding the plow shanks 87 either in front or behind the pipe.

The brackets 86 are detachably secured to the pipe 68 by set screws 88 and each has a hole extending through it through which the plow shanks 87 are adjustably extended and secured therein by other set screws 89.

The plow shanks 87 can have any desired form of point, shovel or blade attached thereto.

As shown by full lines in Figs. 1 and 9, there is a single plow supporting bracket 86 secured to the cross pipe and attached to this bracket is a single breaking plow 90, and shown by dotted lines are two similar plows 190 arranged to throw double furrows.

In the other figures ordinary cultivator points 91 are shown attached to the cross pipe; and, as best shown in Fig. 6, there are five of the points 91 spaced an equal distance apart and arranged with two of the points behind and the others in front of the cross pipe.

It is obvious that the brackets 86 can be spaced on the pipe 68 to suit any form of plow and cultivator.

The wheel 15 is mounted slightly in the rear of the center of gravity so that normally the heaviest weight is at the front end of the apparatus to hold the plow blades or points down, and also the plow handles are arranged so that downward pressure can be manually applied on them to lift the front end of the apparatus clear of the ground so it can be turned around in either direction. In this turning the portion of the tread chain under the wheel 15 forms a pivot on which the apparatus can be turned; and this turning movement is illustrated by double-pointed arrows in Fig. 1.

Also as fragmentally and diagrammatically illustrated in Fig. 3, downward pressure on the handles 51 will tilt the front end of the frame upward so the front end portion of the tread chain will also be carried upward clear of the ground, leaving only the portion of the chain under the wheel 15 in contact with the ground on which to turn, and the spade lugs of the chain are rounded, as previously stated, to aid in an easy turning of the apparatus.

From the foregoing it is obvious that the apparatus can be turned around in either direction by simply pressing the handles downward and then thrusting them sidewise in either direction when the front of the apparatus is clear of the ground.

As illustrated in Fig. 2, the lever 78 can be operated to lower the plow shovels to the usual plowing depth, and in this figure the surface of the soil is indicated by the line 100 and the plowing depth by the line 101.

In Fig. 3 the lever 78 is shown actuated to lift and hold the plow shovels above the surface of the soil, in which position they are held when the apparatus is idle.

In use the engine is started to drive the internal mechanism of the wheel 15, after which the lever 78 is operated to lower the plow shovels into contact with the soil, and then the hand lever 48 is actuated to release the drum 21 so the drive wheel will drive the chain 17 and move the apparatus forward at an ordinary walking speed so an operator can easily follow and guide it by means of the plow handles.

I claim as my invention:

1. A combined plow and cultivator including a narrow main frame, a drive wheel mounted in said frame with its shaft arranged slightly in the rear of the center of gravity of said frame, a carrier wheel mounted in said frame in advance of said drive wheel, a tread chain extended over said wheels, a plow mounted on the front end of said frame, means for rotating said drive wheel to propel said plow forward to disintegrate the soil, a trip frame pivotally connected to the rear end of said main frame for holding said combined plow and cultivator in an upright position when not in use, and plow handles secured to said frame for guiding said plow and cultivator and also for depressing the rear end of said frame so it rocks on the shaft of said drive wheel to lift said plow clear of the ground so said combined plow and cultivator can be turned in a circle in either direction with the portion of the thread chain under said drive wheel forming a pivot on which said combined plow and cultivator can be turned.

2. A combined plow and cultivator including a narrow main frame, a drive wheel mounted in said frame with its shaft arranged slightly in the rear of the center of gravity of said frame, a carrier wheel mounted in said frame in advance of said drive wheel, a tread chain extended over said wheels, a plow mounted on the front end of said main frame, an engine mounted adjacent the rear end of said main frame so its weight will counterbalance the plow at the front end of said main frame, a driving connection between said engine and drive wheel, a trip frame pivotally connected to the rear end of said main frame for holding said combined plow and cultivator in an upright position when not in use, a spring for holding said trip frame either in use or in an idle position, and plow handles secured to said main frame for guiding said combined plow and cultivator and also for depressing the rear end of said frame to lift said plow clear of the ground so said combined plow and cultivator can be turned in a circle in either direction on the pivot formed by the portion of the tread chain under the drive wheel.

3. In a combined breaking plow and cultivator the combination of a frame, a shaft connected thereto, a single drive wheel on said shaft for supporting said frame, a sleeve on said shaft adjacent one end thereof, a sprocket wheel secured to one end of said sleeve, gear teeth integral with the other end of said sleeve, an engine on said frame in driving connection with said sprocket wheel, an internal gear in said drive wheel, a planetary gear driving connection between the teeth on said sleeve and said internal gear, and a clutch on said shaft for controlling the rotation of said drive wheel when said engine is in operation.

GEORGE J. ZIEGLER.